United States Patent
Kamgang et al.

(10) Patent No.: US 11,899,036 B2
(45) Date of Patent: Feb. 13, 2024

(54) METHODOLOGY FOR ANNULAR SOLIDS AND FLUIDS DIFFERENTIATION THROUGH INTEGRATION OF SHEAR AND FLEXURAL ULTRASONIC ACOUSTIC WAVES

(71) Applicants: Sebastien Kamgang, Houston, TX (US); John F. Priest, Tomball, TX (US); Douglas Patterson, Magnolia, TX (US); Joseph Olaiya, Houston, TX (US); Baoyan Li, Tomball, TX (US); Muhammad Abrar Manzar, Spring, TX (US)

(72) Inventors: Sebastien Kamgang, Houston, TX (US); John F. Priest, Tomball, TX (US); Douglas Patterson, Magnolia, TX (US); Joseph Olaiya, Houston, TX (US); Baoyan Li, Tomball, TX (US); Muhammad Abrar Manzar, Spring, TX (US)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 0 days.

(21) Appl. No.: 17/540,457

(22) Filed: Dec. 2, 2021

(65) Prior Publication Data
US 2022/0178804 A1    Jun. 9, 2022

Related U.S. Application Data

(60) Provisional application No. 63/121,572, filed on Dec. 4, 2020.

(51) Int. Cl.
*G01N 9/36* (2006.01)
*E21B 47/005* (2012.01)
(Continued)

(52) U.S. Cl.
CPC ............. *G01N 9/36* (2013.01); *E21B 47/005* (2020.05); *E21B 33/14* (2013.01); *E21B 47/07* (2020.05)

(58) Field of Classification Search
CPC ...... G01N 9/36; G01N 29/4427; E21B 33/14; E21B 47/005; E21B 47/07
See application file for complete search history.

(56) References Cited

U.S. PATENT DOCUMENTS

| | | | | |
|---|---|---|---|---|
| 4,896,303 A | * | 1/1990 | Leslie | G01V 1/50 702/6 |
| 5,077,697 A | * | 12/1991 | Chang | G01V 1/44 702/6 |

(Continued)

FOREIGN PATENT DOCUMENTS

| | | | | |
|---|---|---|---|---|
| CN | 1211654 C | * | 7/2005 | ......... E21B 47/0005 |
| CN | 110295892 A | | 10/2019 | |

OTHER PUBLICATIONS

Hongzhi et al. "New Practices for Cement Integrity Evaluation in the Complex Environment of Xinjiang Oil Field" SPE 157976 (Year: 2012).*

(Continued)

*Primary Examiner* — John Fitzgerald
(74) *Attorney, Agent, or Firm* — CANTOR COLBURN LLP (57) ABSTRACT

Methods for determining properties of a media on an exterior of a casing in downhole systems are described. The methods include conveying a logging tool through a casing in a downhole formation, stimulating shear waves and flexural waves in the casing, obtaining a shear attenuation rate measurement and a flexural attenuation rate measurement within the casing responsive to the media on the exterior of the casing, comparing the measured shear attenuation rate and the measured flexural attenuation rate against (Continued)

a plurality of respective division boundary values, and determining one or more properties of the media on the exterior of the casing based on the comparison of the measured shear attenuation rate and the measured flexural attenuation rate against the plurality of respective interfaces.

20 Claims, 6 Drawing Sheets

(51) Int. Cl.
      *E21B 33/14*       (2006.01)
      *E21B 47/07*       (2012.01)

(56) References Cited

U.S. PATENT DOCUMENTS

| | | | |
|---|---|---|---|
| 6,483,777 B1 | 11/2002 | Zeroug | |
| 7,149,146 B2* | 12/2006 | Kuijk | E21B 47/005 |
| | | | 181/105 |
| 10,119,387 B2* | 11/2018 | van Kuijk | E21B 47/005 |
| 10,557,959 B2* | 2/2020 | Matuszyk | E21B 47/005 |
| 10,697,286 B2* | 6/2020 | Merciu | G01V 1/50 |
| 11,460,446 B2* | 10/2022 | Dutta | G01V 1/46 |
| 11,592,591 B2* | 2/2023 | Cabella | E21B 47/107 |
| 2006/0233048 A1 | 10/2006 | Froelich et al. | |
| 2017/0090058 A1* | 3/2017 | Brill | G01V 1/50 |
| 2017/0115414 A1 | 4/2017 | Wang et al. | |
| 2018/0128094 A1 | 5/2018 | Merciu | |
| 2022/0381138 A1* | 12/2022 | Rego | G01V 1/50 |

OTHER PUBLICATIONS

Al-Suwaidi et al. "Increased Certainty in the Determination of Zonal Isolation Through the Integration of Annulus Geometry Imaging and Improved Solid-Fluid Discrimination" SPE 120061 (Year: 2009).*
International Search Report and Written Opinion for International Application No. PCT/US2021/061535; International Filing Date Dec. 2, 2021; Report dated Apr. 1, 2022. 11 pages.

* cited by examiner

METHODOLOGY FOR ANNULAR SOLIDS AND FLUIDS DIFFERENTIATION THROUGH INTEGRATION OF SHEAR AND FLEXURAL ULTRASONIC ACOUSTIC WAVES

CROSS REFERENCE TO RELATED APPLICATIONS

This application claims the benefit of an earlier filing date from U.S. Provisional Application Ser. No. 63/121,572, filed Dec. 4, 2020, the entire disclosure of which is incorporated herein by reference.

BACKGROUND

During completion phases of an oil and/or gas well, one typical completion methodology consists of pieces (e.g., joints) of tubular casings of one or multiples diameter sizes connected to one another and placed inside the wellbore. Such pieces or divisions of casing are disposed along the length of a drilled open hole. The divisions of casing are cemented in place, thus securing or cementing the casings to a formation surface that defines the open hole (e.g., the previously drilled bore hole). In some operations, in addition to an initial completion design, a smaller diameter casing can be placed inside a larger diameter casing and cemented within the larger diameter casing.

The annular space formed between the outside diameter of the casing and the inner surface of the wellbore formation walls (sand face) is then filled with material generally referred to as cement. The selected material type, chemical composition, rheological properties and placement methodology of the cement are all designed to produce a liquid slurry, which after placement in the annular space, will gradually cure into a solid and provide some fundamentals benefits to the oil and/or gas well. While the selected material type is usually a form of cement, other materials e.g. resins and foams, are also used. The terms cement and solids/cement, etc., are inclusive of these other materials.

SUMMARY

Disclosed and described herein is a methodology for annular solids and fluids differentiation through integration of shear and flexural ultrasonic acoustic waves. According to some embodiments, methods for determining properties of a media on an exterior of a casing are described. The methods, in accordance with one non-limiting embodiment, include conveying a logging tool through a casing, stimulating shear waves and flexural waves in the casing, obtaining a shear attenuation rate measurement and a flexural attenuation rate measurement within the casing responsive to the media on the exterior of the casing, comparing the measured shear attenuation rate and the measured flexural attenuation rate against a plurality of respective division boundary values, and determining one or more properties of the media on the exterior of the casing based on the comparison of the measured shear attenuation rate and the measured flexural attenuation rate against the plurality of respective interfaces

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
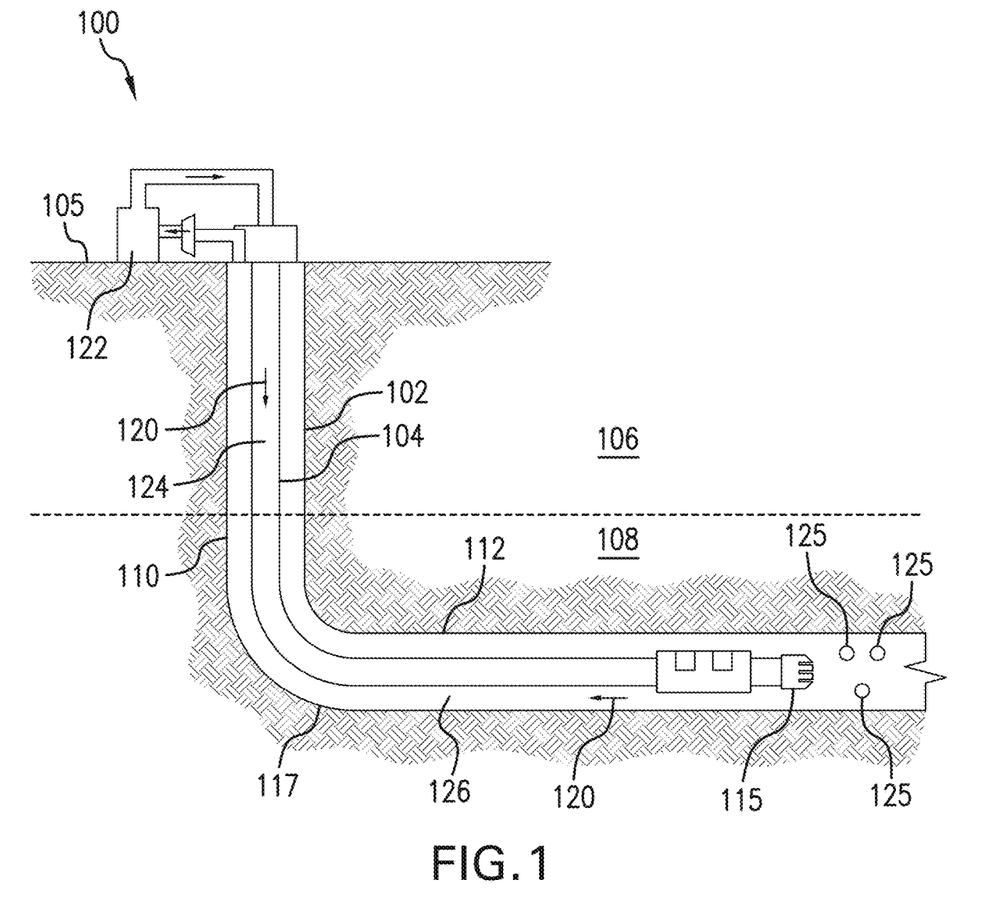
FIG. 1 depicts a drilling operation in a wellbore.

Referring to FIG. 1, a drilling system 100 is shown forming a wellbore 102. A drill string 104 is used to drill the wellbore 102 through an earth layer 106 and into a reservoir or formation 108 beneath the earth layer 106. As shown, at a selected depth, the drill string 104 is deviated from drilling a vertical division 110 of the wellbore to a drilling a deviated or lateral division 112 of the wellbore 102.

The drill string 104 includes a drill bit 115 at a bottom end for disintegrating the earth layer 106 and the formation 108 into cuttings 125. A drilling mud 120 is circulated from a mud pit 122 at the surface 105 to pass downhole through a bore 124 of the drill string 104 to exit into the wellbore 102 at the drill bit 115. Upon exiting the drill bit 115, the mud 120 is circulated back up hole via an annulus 126 between the drill string 104 and a wall 117 of the wellbore 102. In the process, the drilling mud 120 carries the cuttings 125 from the bottom of the wellbore 102 to the surface 105. At the surface 105, a separator 128 is configured to separate the cuttings 125 from the drilling mud 120 and return the drilling mud 120 to the mud pit 122. During the drilling operation and formation of the wellbore 102, mud logging can be used to determine parameters of the formation 108 from the cuttings 125 brought to the surface by the drilling mud 120.

Once the wellbore 102 is completed with the drilling operation, casing may be installed into the wellbore 102. During the completion phase of an oil and/or gas well, pieces (joints) of tubular casings of one or multiples diameter sizes are connected to one another and placed inside the wellbore 102. The casings are disposed along the length of the wellbore 102. These casings are then cemented in place to the wall 117 of the wellbore 102. In some embodiments, a second, smaller diameter casing can be installed within the larger diameter casing and also cemented.

To perform a cementing operation, the annular space formed between the outside diameter of the casing and the inner surface of the wellbore formation walls 117 (referred to as a "sand face") is filled with material. This material is generally referred to as cement. The selected material type, chemical composition, rheological properties, and placement methodology of the cement may all designed or selected to produce a liquid slurry. This liquid slurry is conveyed or pumped downhole through the inside of the casing to the bottom and rises in the annulus between the casing and the sand face. After placement of the slurry in the annular space, the slurry will gradually cure into a solid. The solidified cement can provide benefits to the completed oil and/or gas well.

For example, the cement may provide mechanical support and protect the casing. The cured cement may provide additional mechanical support to the casing (as compared to free standing casing) for added resistance to downhole mechanical stresses and pressures. Further, such cement can provide hydraulic isolation between different geological formations (e.g., zones). Different zones may be isolated to better account for individual or specific contributions to an overall production result from the well. Some formations may also contain mostly underground water, which may be unwanted or undesirable for production. In such instances, it may be necessary or advantageous to isolate the water zones from oil and/or gas zones of interest. Cementing of a casing can prevent underground fluids under natural formation pressures from flowing or migrating toward the surface. This migration can cause contamination of freshwater aquifers, which may be undesirable. If uncontrolled, such migration may cause risk to humans and the environment. The cement may also prevent and/or delay casing corrosion. The tubular casing is typical made of carbon steel and, as such, can corrode at some point during the life cycle of the oil and/or gas well. Protecting the casing with properly cured cement can prevent or significantly delay the corrosion process, thus increasing the life of the well and/or preventing repairs and related activities.

These benefits, among other benefits and advantages, can be achieved and evaluated by employing methodologies described herein. Embodiments of the present disclosure are directed to determining the properties, characteristics, and state of the cement between a casing and a sand face or between an inner casing and an exterior casing. Embodiments of the present disclosure may be used to determine if the material behind casing is cement, a mix of cement and formation material, or just formation material. The formation material may directly contact the casing due to movement or settling over some time span (e.g., moving sands, shales creeps, etc.). Such investigation and monitoring may be necessary to achieve the above objectives, and to ensure that the cement is cured from an initial liquid phase into a solid material. The goal is to have the cement completely fill the annular space between the tubular casing and the wellbore wall (sand face) or between an inner casing and an outer casing.

Figure 2:
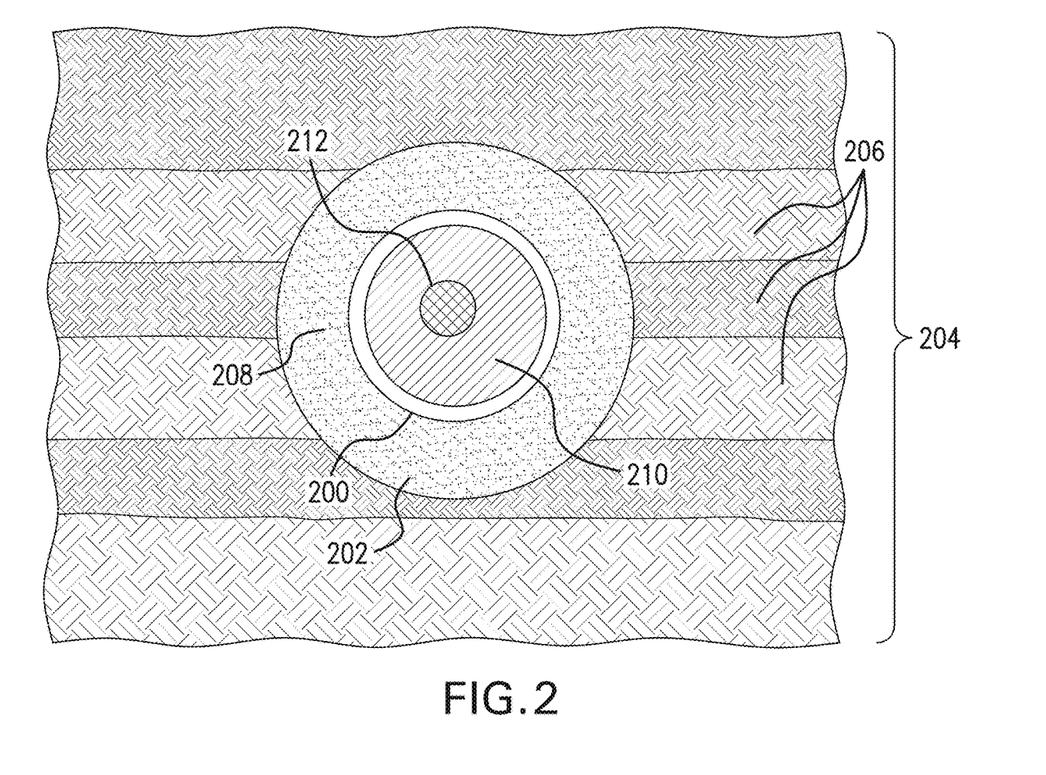
FIG. 2 is a schematic illustration of a casing disposed within a wellbore and cemented therein.

Turning now to FIG. 2, an ideal cementing of a borehole or wellbore is shown. As shown, a casing 200 is disposed within a wellbore 202. The wellbore 202 is disposed within a formation 204 that comprises one or more different formation layers 206. The wellbore 202 may be formed using a drilling system, such as shown and described above.

After the wellbore 202 is formed and the casing 200 is disposed therein, cement 208 may be pumped or otherwise conveyed through the inside of the casing into an annulus between the wall of the wellbore 202 (e.g., sand face) and the exterior of the casing 200. A casing fluid 210 may be conveyed into the interior of the casing 200 and a logging tool 212 may also be convey through the interior of the casing 200 (e.g., within the casing fluid 210). The logging tool may be a wireline cement evaluation logging tool configured to obtain information regarding the cement 208 that is exterior to the casing 200. FIG. 2 illustrates the casing 200 arranged and having a good azimuthal distribution of the cement 208 around the casing 200 within the annular space between the outer surface of the casing 200 and the wall of the wellbore 202.

Although an optimal distribution is shown in FIG. 2, such optimum cement quality result around the casing is not always achieved. More often than not, the best-desired cement quality might only be achieved across some depth intervals and not others. As such, a variation of cement conditions is typically expected across different depth intervals. These variations can range from a complete absence of cement (referred to as free pipe) on one end of the spectrum to a fully cured cement to the opposite end of the spectrum. These variations are longitudinal with respect to the depth or length of the wellbore (e.g., in a direction from surface to wellbore bottom/end). However, complicating the matter, at any given interval (depth or length), cement conditions can also vary azimuthally around the casing. The cement condition and the quality thereof can also change over the life cycle of the well. Such variations longitudinally, azimuthally, and time can have implications on hydraulic isolation, casing protection, etc.

Due to these potential variations in the cementing process, an accurate determination of the cement condition or any other solids, such as formation around the casing, is necessary. Such determination or investigation may be the first step in identifying problematic intervals suitable for remedial cementing operations. The most often methodology used in the industry to verify the condition of the cement is the conveyance of wireline acoustic tools (i.e., wireline cement evaluation logging tools). This is illustrated in FIG. 2 by logging tool 212 suspended within the casing fluid 210 and within the casing 200. Such tools are conventionally configured to make downhole measurements of acoustic waves with real-time readout at the surface. In other configurations, the acoustic wave data may be saved in a memory module built into the tool and later retrieved after the tool is removed from the casing. In such instances, once the tool is retrieved to the surface, the acoustic wave data may be harvested from the memory and analyzed.

The wireline cement evaluation-logging tools may be designed with fixed or varying transmitter frequencies (e.g., acoustic wave frequencies). The frequencies can be sonic or ultrasonic. Typical tool designs include one or multiple transducers configured to emit acoustic waves into the casing fluid and/or the casing. One or multiple receivers are arranged at a fixed distance from the transmitter(s) and configured to detect the emitted wave and detect and/or record an amplitude of the received wave. The type of waves can be compressional, shear, or flexural waves.

A direction of propagation of a compressional wave is the same as a direction of particle displacement. The compressional waves can travel through liquid and/or solid media. Shear waves have a direction of propagation perpendicular to the direction of particle displacement and can travel only through a solid medium with a non-zero shear strength. The shear waves propagating in a casing whose particle motion is parallel to the casing wall have no component of motion perpendicular to the wall, therefore, this shear wave can only transmit energy outside of the casing when the casing is bonded to a material with a non-zero shear strength. A flexural wave is a mixture of a compressional component and a shear component. Typically, the flexural waves deform transversely as they propagate and are more complicated or complex than shear or compressional waves, in part because flexural waves can partition energy into both compressional and shear waves at an interface where the details of this partitioning depend upon material properties and geometric properties at the interface. The compressional wave component makes the flexural waves sensitive to both fluids and solids (with zero or non-zero shear strengths).

Figure 3:
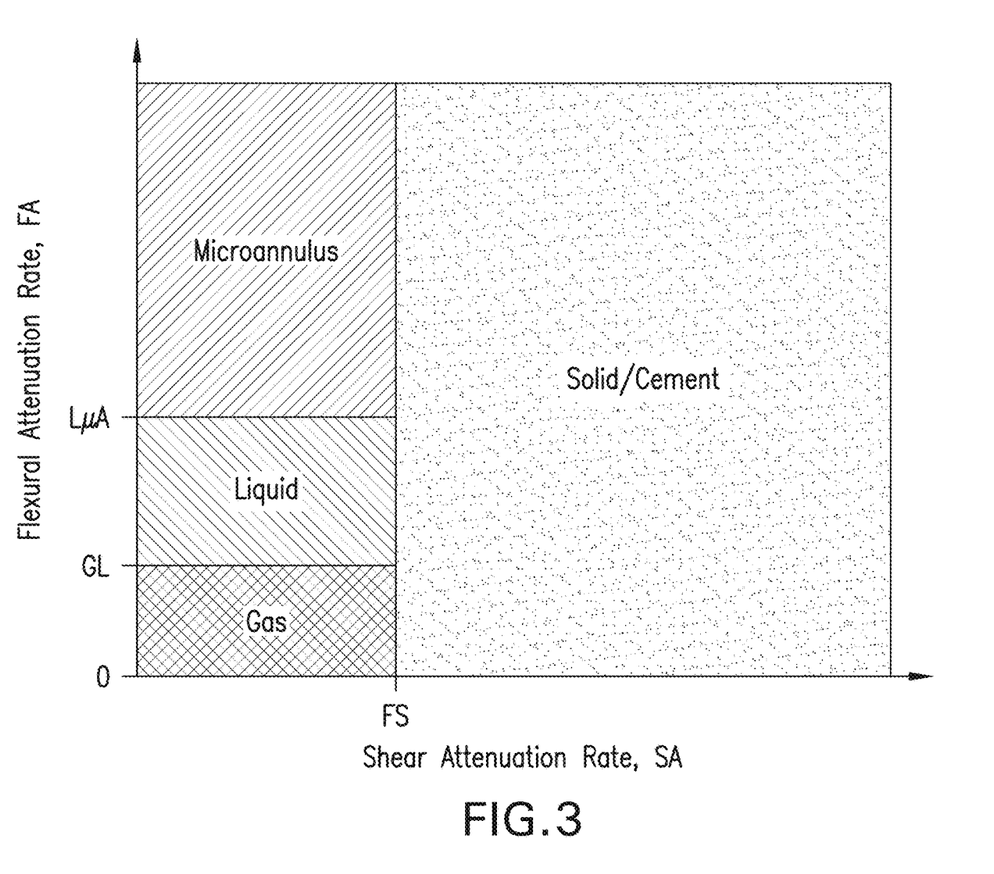
FIG. 3 is a schematic plot of attenuation rate interfaces to indicate a media property in accordance with conventional methodologies.

Typical cement evaluation technologies in the industry can only differentiate a limited number of conditions behind casing (bonded, liquid, gas and micro-annulus (μA)). For example, as shown in FIG. 3, shear attenuation rate increases to the right along the horizontal axis and flexural attenuation rate increases upward on the vertical axis. Under conventional methodologies, the investigation of cement may only determine between solid/cement, gas, liquid, and micro-annulus. Limitations of the measurement and analysis methodologies can restrict the available solution set to less than what may be desired, e.g., the measurement may support identification of material behind the casing but the analysis methodology may not allow this sub-classification. Collectively, gas and liquids are fluids; consequently, when the term fluid is used the term includes both gas and liquid. Whenever the specificity is less general, gas or liquid will be used as appropriate. In this disclosure the term interface is used to denote an interface between adjacent regions, in some contexts this may have been called a threshold. In FIG. 3, LμA (Liquid micro-Annulus) is an upper flexural attenuation rate interface separating the liquid and micro-annulus states of the material on the exterior of the casing, GL (Gas Liquid) is a lower flexural attenuation rate interface separating the liquid and gas states of the material on the exterior of the casing, and FS (Fluid Solid) is the shear wave interface separating the fluid states from the solid/cement state of the material on the outside of the casing. Conventional determinations, as shown in FIG. 3, are typically based on acoustic impedance and flexural attenuation rate.

In accordance with embodiments of the present disclosure, methodologies that integrate shear and flexural waves are provided for an accurate differentiation of the condition in the annulus between the casing and the formation walls, and/or the condition in the annular space between two casings (concentric casings). The proposed algorithm is different from the convention methodologies in that it differentiates different types of solids bonded to the casing. Further, in accordance with some embodiments, through an improved evaluation of the flexural wave, differentiation of different conditions when there are no solids bonded to the casing are possible, for a total of nine different conditions/states to be monitored for (in contrast to the four conditions/states of the conventional systems).

Figure 4A:
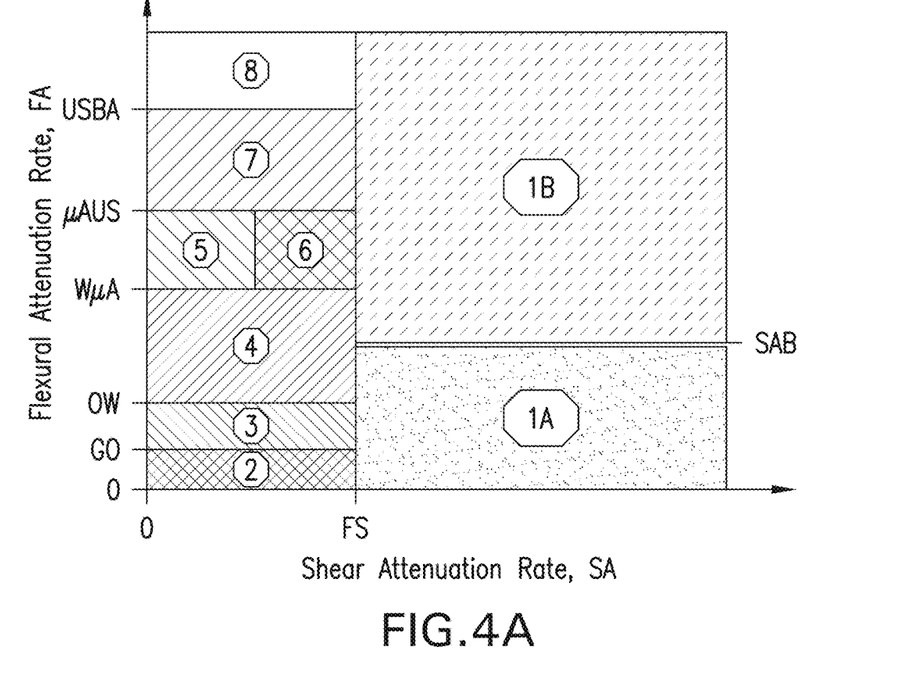
FIG. 4A is a schematic plot of attenuation rate interfaces to indicate a media property in accordance with an embodiment of the present disclosure.
Figure 4B:
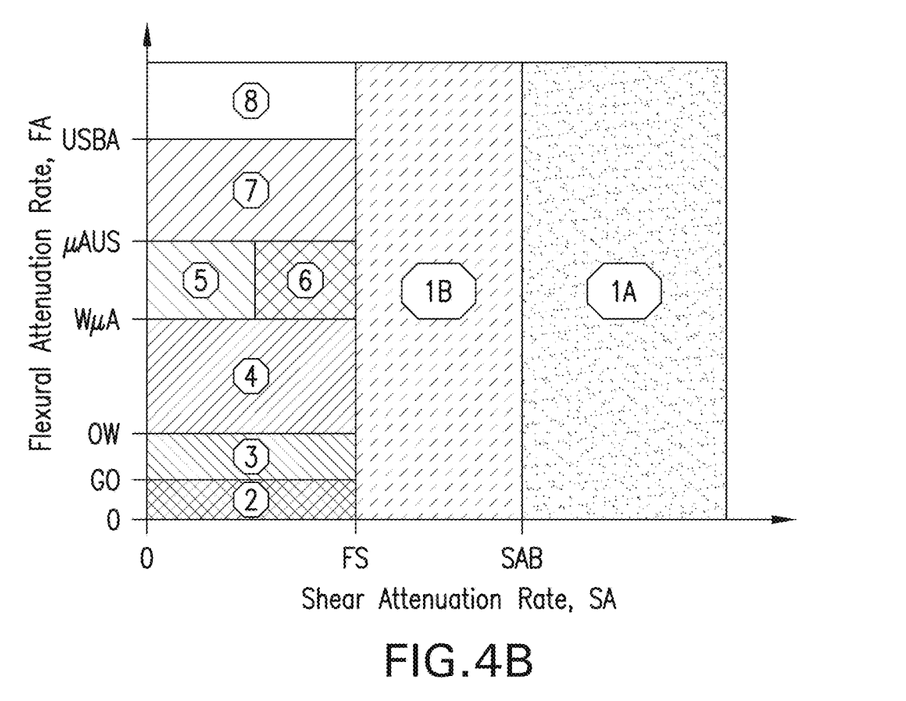
FIG. 4B is a schematic plot of attenuation rate interfaces to indicate a media property in accordance with an embodiment of the present disclosure.

FIGS. 4A-4B are illustrative plots of the division of conditions/states that may be determined based on implementation of embodiments of the present disclosure. In FIGS. 4A-4B, shear attenuation (SA) rate is along the horizontal axis and flexural attenuation (FA) rate is illustrated on the vertical axis. In FIG. 4A-4B, the same base four divisions are present, gas, liquid, micro-annulus and solid/cement. Where these four divisions were divided based on LμA, GL, and FS, the divisions have been further subdivided into nine divisions, providing more specific and accurate conditions. To be more descriptive within the nine divisions, the earlier division dividers, LμA and GL have been changed to WμA and GO. In the left half of FIGS. 4A-4B, the flexural attenuation rate has been subdivided into seven subdivisions. Any of the divisions illustrated in FIGS. 4A-4B may be subdivided into additional subdivisions, such as division 1A and/or 1B may be subdivided based on data from the flexural attenuation rate or by the establishment of a second shear threshold (SAB). In the right half of FIG. 4A, the solid/cement has been subdivided into two divisions separated by a flexural attenuation line SAB (horizontal line separating divisions 1A and 1B). Division 1A of FIG. 4A comprises materials in a solid state with higher acoustic impedance (higher density and velocities), presenting relatively higher shear attenuations and lower flexural attenuations. Division 1B of FIG. 4A comprises materials in a solid state with lower acoustic impedance (lower density and velocities), presenting relatively lower shear attenuations and higher flexural attenuations. In the right half of FIG. 4B, the solid/cement has been subdivided into two divisions separated by an additional shear attenuation line SAB (vertical line separating divisions 1A and 1B). Division 1A of FIG. 4B comprises materials in a solid state with higher acoustic impedance (higher density and velocities), presenting relatively highest shear attenuations. Division 1B of FIG. 4B comprises materials in a solid state with lower acoustic impedance (lower density and velocities), presenting relatively lower shear attenuations. Starting from the bottom left the flexural subdivisions are: Gas, lower density liquids (e.g., oil), higher density liquids (e.g., water), Micro-annulus (μA), unconsolidated, contaminated, and other lightweight materials with low acoustic impedance material could be in a "gelation" state (UCLAI) and Barite. The interfaces between these divisions is provided in Table 1:

TABLE 1

Definition of Shear and Flexural Attenuation Divisions

| Material | Code | Top of | Bottom of | Result | Condition |
|---|---|---|---|---|---|
| Solid cement with high acoustic impedance (1A) | SCA | 0 | Solid/Cement | Solid | FS < SA (FIG. 4A) <br> FA < SAB (FIG. 4A) <br> FS < SA > SAB (FIG. 4B) |
| Solid cement with lower acoustic impedance (1B) | SCB | SCA | ∞ | Solid | FS < SA (FIG. 4A) <br> FA > SAB (FIG. 4A) <br> FS < SA < SAB (FIG. 4B) |
| Gas (2) | | 0 | Low density liquids | Gas | 0 < FA < GO |
| Low density liquids (3) | GO | Gas | High density liquids | Low density liquids | GO < FA < OW |
| High density liquids (4) | OW | Low density liquids | uA | High density liquids | OW < FA < WuA |
| Micro-annulus (5) | WuA | High density liquids | UCLAI | uA | WuA < FA < uAUS |
| Micro-annulus (6) | WuA | High density liquids | UCLAI | uA | WuA < FA < uAUS |
| Unconsolidated, contaminated and others lightweight materials (7) | uAUS | uA | Barite | UCLAI | uAUS < FA < USBA |
| Barite (8) | USBA | UCLAI | ∞ | Barite | USBA < FA |

In Table 1 and FIGS. 4A-4B, the following notations are employed:

On the Horizontal Axis:

Fluid-solid division (FS) lies on the horizontal axis (FIG. 4A)

Fluid-solid division (FS) and shear threshold (SAB) lie on the horizontal axis (FIG. 4B)

On the vertical axis:
For Shear Attenuation (SA) values greater than Fluid-solid division (FS), high or low acoustic impedance solids flexural interface division (SAB) lie on the vertical axis (FIG. 4A).
For Shear Attenuation (SA) values less than Fluid-solid division (FS), Gas-low density liquids (GO), Low density liquids-High density liquids (OW), High density liquids-Micro-annulus (WμA), Micro-annulus-unconsolidated, contaminated and other lightweight materials with low acoustic impedance ((μAUS), unconsolidated, contaminated and other lightweight materials with low acoustic impedance-Barite (USBA) (FIGS. 4A-4B).
Other notations:
Shear Attenuation (SA), and Flexural Attenuation (FA) in the conditions column is based on a measured shear attenuation rate (SA) and a measured flexural attenuation rate (FA).

The micro-annulus, in FIGS. 4A-4B, above the flexural attenuation rate WμA, has been subdivided into two divisions indicative of the relative size of the micro-annular gap. Differentiation between these two divisions may be based on additional measurements, such as that from Pulse-Echo type instruments.
  a. Micro-annulus (5) with a relatively smaller annular gap (e.g., less than 200 microns)
  b. Micro-annulus (6) with a relatively larger annular gap (e.g., 200 microns or greater)
Below the Fluid/Solid Interface FS
  a. The Gas division (2) indicates gas behind casing when the attenuation rates are below the gas-low density liquid interface.
  b. The low density liquid division (3) indicates low density liquid (e.g., oil) behind casing and lies above the Gas-low density liquid interface and below the low density liquid-high density liquid interfaces.
  c. The high density liquid division (4) indicates high density liquid (e.g., water) behind casing and lies between the low density liquid-high density liquid and high density liquid-Micro-annulus (5, 6) interfaces.
  d. The micro-Annulus division (5, 6) indicates micro-annulus behind casing, and lies between the Micro-annulus and unconsolidated, contaminated and others lightweight materials with low acoustic impedance interfaces. There is solid material behind the casing, however there is a fluid-filled gap between the outside of the casing and a front of the solid materials.
  e. The unconsolidated, contaminated and others lightweight materials with low acoustic impedance division (7) indicates either cement slurry or unconsolidated materials and other light weight and low acoustic impedance materials behind the casing and lies between the Micro-annulus and Barite interfaces. The unconsolidated, contaminated and others lightweight materials with low acoustic impedance behind casing can arise from multiple sources, settled mud weighting solids, bentonite, uncured cement, formation sands and debris, low acoustic impedance materials, etc.
  c. The Barite division (8) indicates Barite or other high-density mud-weighting material behind casing and lies above the unconsolidated, contaminated and others lightweight materials with low acoustic impedance division.
Above the Fluid/Solid interface FS
  a. The solid/cement (SCA) division (1A) infers a strong cement and lies above the interface FS and below the interface SAB. The material is in a solid state, high acoustic impedance (higher density and velocities), presenting relatively higher shear attenuations and lower flexural attenuations (FIG. 4A). This subdivision also presents the highest shear attenuations above SAB threshold (FIG. 4B).
  b. The solid/cement (SCB) division (1B) infers a weaker cement and lies above the interface FS and below the interface SAB. This division includes materials in a solid state, lower acoustic impedance (lower density and velocities), presenting relatively lower shear attenuations and higher flexural attenuations (FIG. 4A). This subdivision present relatively lower shear attenuations below SAB threshold (FIG. 4B).

The determinations, as shown in FIGS. 4A-4B, and in accordance with some embodiments of the present disclosure, are based on shear attenuation rate and flexural attenuation rates. The differentiation illustrated in FIGS. 4A-4B may be obtained through cross-plotting the shear-measured attenuation rate (SA) on the x-axis and the flexural measured attenuation rate (FA) on the y-axis. The shear and flexural attenuation rate division boundaries are functions of casing diameter, casing thickness, cement properties and sensor properties, and can be determined through modeling and/or empirical testing of each specific casing size/weight.

Shear waves do not propagate in fluids, only through solids. Generally, as a given solid gets stronger the elastic moduli and shear and compressional velocities in the solid increase. When measuring cement behind casing, the properties of the measurement primarily depend on the acoustic impedance of the cement and the bond between the casing and the cement. The fully cured cement strength sets an upper limit to the acoustic impedance of the cement, and an upper limit to the attenuation rate that would be expected for the measurements. Green or not fully cured, contaminated, patchy or debonded cement will degrade the attenuation rate measurements below the expected fully cured cement attenuation rates.

If the measured shear attenuation rate is below the determined shear fluid/solid interface FS, the flexural measured attenuation rate can then be used to further differentiate the other seven possible options. The flexural response is lowest in a gas medium. This attenuation rate usually increases with the density of the fluid/solids in which the wave is propagating. The determination of the various interfaces to identify the interfaces is done empirically.

Figure 5:
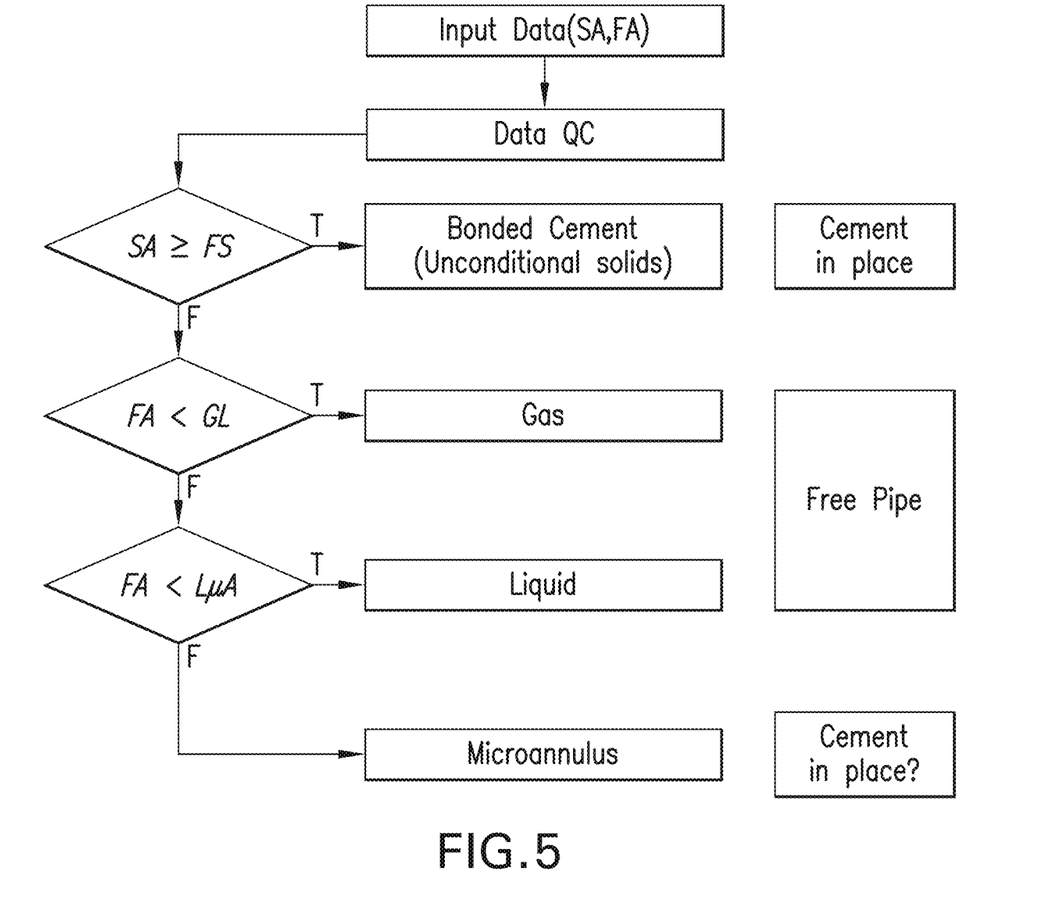
FIG. 5 is a schematic diagram of a methodology for determining media properties in accordance with conventional methodologies.

FIG. 5 illustrates the methodology for determining the state/condition of materials/media that are on the exterior of a casing using the model from FIG. 3. The FIG. 5 flowchart shows the four identified divisions from FIG. 3 as the solution of a logical decision tree for determining the cement properties.

Pursuant to the flowchart of FIG. 5, if the shear attenuation rate (SA) is greater than or equal to the fluid/solid (FS) interface, then the result is bonded cement. Else, if the flexural attenuation rate (FA) is less than the gas-liquid interface, GL, then the result is gas. Else, if the flexural attenuation rate, (FA) is less than the liquid-micro-annulus interface (LμA), then the result is liquid. Otherwise, the result is micro-annulus.

Figure 6:
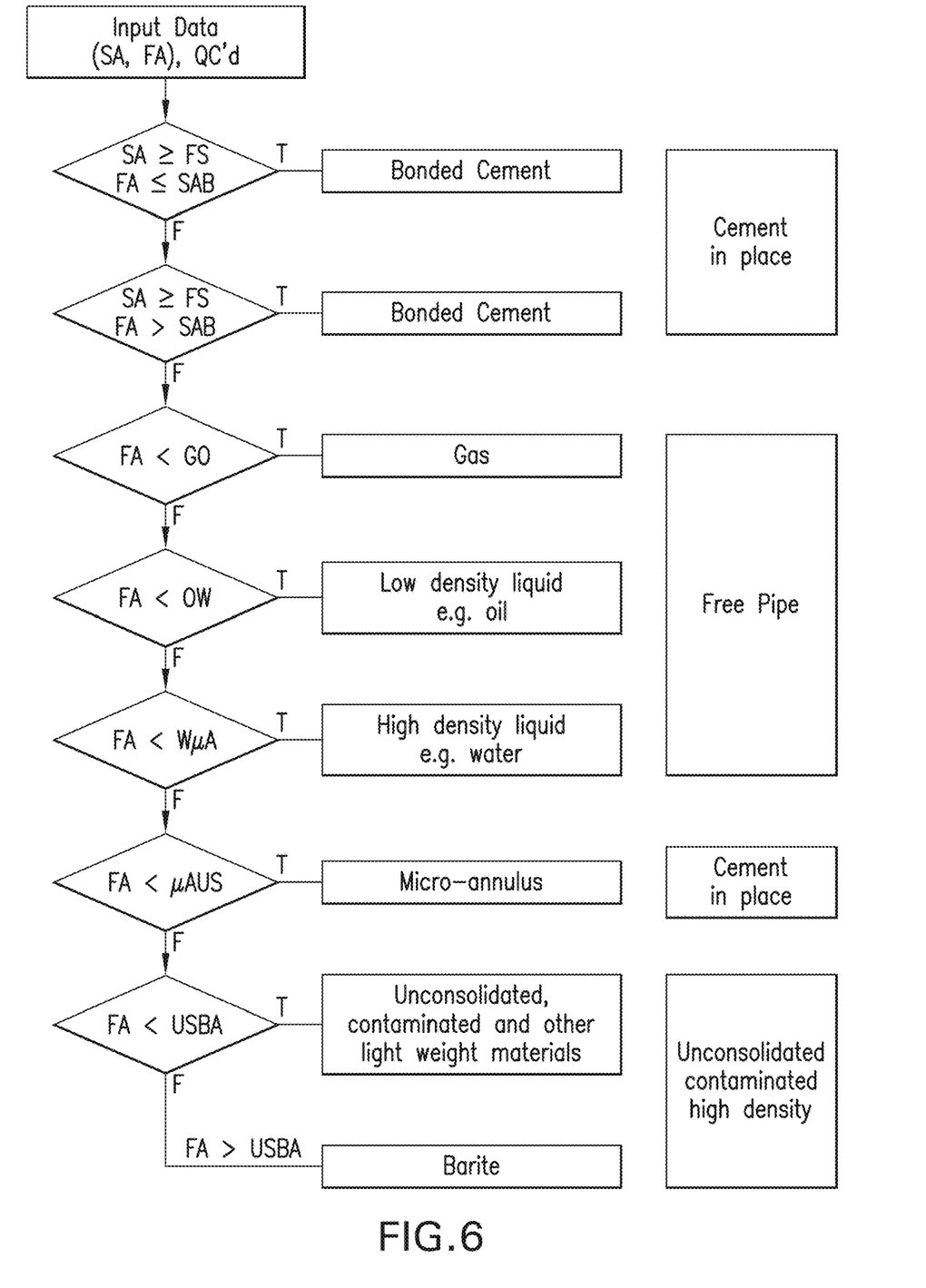
FIG. 6 is a schematic diagram of a methodology for determining media properties in accordance with an embodiment of the present disclosure.

FIG. 6 illustrates the methodology for determining the state/condition of materials/media that are on the exterior of a casing using the model from FIGS. 4A-4B. The FIG. 6 flowchart shows eight of the nine identified divisions from FIGS. 4A-4B as the solution of a logical decision tree for determining the cement properties.

Pursuant to the flowchart of FIG. 6, if the shear attenuation rate (SA) is greater than or equal to the fluid/solid (FS) interface and the flexural attenuation is lower than or equal to the SAB interface, then the result is bonded solid/cement (1A). The SAB interface is expected to vary based on cement properties and can be defined based on preferences in definition of fast/slow cement velocities (FIG. 4A). If the shear attenuation rate (SA) is greater than the fluid/solid (FS) interface and greater than or equal to the SAB interface, then the result is bonded solid/cement (1A) (FIG. 4B). The SAB interface is expected to vary based on cement properties and can be defined based on preferences in definition of fast/slow cement velocities (FIG. 4B). Else, if the shear attenuation is greater than the fluid solid interface (FS), and the flexural attenuation is greater than the SAB interface, then the result is bonded solid/cement (1B) (FIG. 4A). If the shear attenuation is greater than the fluid solid interface (FS) and lower than the SAB interface, then the result is bonded solid/cement (1B) (FIG. 4B). Else, if the flexural attenuation rate (FA) is less than the gas-low density liquid interface, GO, then the result is gas. Else, if the flexural attenuation rate (FA) is less than the low density liquid-high density liquid interface, OW, then the result is low density liquid. Else, if the flexural attenuation rate, (FA) is less than the high density liquid-micro-annulus interface (WμA), then the result is high density liquid. Else, if the flexural attenuation rate, (FA) is less than the micro-annulus-unconsolidated, contaminated and other lightweight materials with low acoustic impedance ((μAUS), then the result is micro-annulus. Else, if the flexural attenuation rate, (FA) is less than the unconsolidated, contaminated and others lightweight materials with low acoustic impedance-Barite interface (USBA), then the result is unconsolidated, contaminated and others lightweight materials with low acoustic impedance. Otherwise, the result is barite or other high-density mud-weighting unconsolidated material.

The shear S0 waves interface values are typically constant over most casings. The shear S1 and S2 wave tend to vary more as they are somewhat dispersive. The flexural attenuation rate values vary quite a bit as the flexural waves are quite dispersive. Generally, the various interface values must be determined empirically because variations in system noise, casing conditions, casing geometry, dispersion changes generally cannot be modeled.

TABLE 2

Typical Shear and Flexural Attenuation Interface Values:

| Material | Code | Shear S0 dB/ft. | Shear S1 dB/ft. | Flexural dB/ft. |
|---|---|---|---|---|
| Solid cement with high acoustic impedance (1A) | SCA | 2 | 4 | ≤25 |
| Solid cement with lower acoustic impedance (1B) | SCB | 2 | 4 | ≤25 |
| Gas | | 2 | 2 | 10 |
| Low density liquid | GO | 2 | 2 | 15 |
| High density liquid | OW | 2 | 2 | 20 |
| Micro-annulus (5) | WuA | | | 25 |
| Micro-annulus (6) | WuA | | | 25 |
| unconsolidated, contaminated and others lightweight materials | uAUS | | | 35 |
| Barite | USBA | | | 45 |

These typical values are for the preferred embodiment that may not be representative of all embodiments. In general, these attenuation rate boundaries will depend on the casing diameter, thickness, the fluid and solid properties behind the casing, the shear and flexural operating frequencies, wave propagation modes and various tool configuration properties. Additional measurements, such as nuclear, temperature, pulse-echo, CBL (cement bond log), VDL (variable density log), etc., may be integrated either individually or in various combinations to help delineate and refine the differentiation between various solids and fluids regions.

Although prior methodologies were able to identify up to four different conditions behind casing, embodiments of the present disclosure enable differentiating based on the shear and flexural response for a much more detailed discrimination of up to nine different conditions (e.g., fluids and solids) behind a casing. This is a significant improvement in cement evaluation and produces an output which covers additional conditions which could exist behind the casing.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While embodiments described herein have been described with reference to specific figures, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed, but that the present disclosure will include all embodiments falling within the scope of the appended claims or the following description of possible embodiments.

Embodiment 1: A method for determining properties of a media on an exterior of a casing, comprising: conveying a logging tool through a casing in a downhole formation; stimulating shear waves and flexural waves in the casing; obtaining a shear attenuation rate measurement and a flexural attenuation rate measurement within the casing responsive to the media on the exterior of the casing; comparing the measured shear attenuation rate and the measured flexural attenuation rate against a plurality of respective division boundary values; and determining one or more properties of the media on the exterior of the casing based on the comparison of the measured shear attenuation rate and the measured flexural attenuation rate against the plurality of respective interfaces.

Embodiment 2: The method according to any preceding embodiment, wherein the media on the exterior of the casing comprises at least one of gas, low density liquid, high density liquid, micro-annulus, light-weight solids materials, or solids bonded to casing.

Embodiment 3: The method according to any preceding embodiment, further comprising determining if a solid in the annular space is bonded to the casing or to the downhole formation.

Embodiment 4: The method according to any preceding embodiment, further comprising evaluating cement behind the casing in a liquid/slurry form and determining a distinction of such liquid/slurry from other liquids.

Embodiment 5: The method according to any preceding embodiment, further comprising evaluating mechanical properties of a solid bonded to the casing.

Embodiment 6: The method according to any preceding embodiment, further comprising integrating at least one additional measurement to the shear attenuation rate measurement and a flexural attenuation rate measurement to determine the one or more properties of the media on the exterior of the casing.

Embodiment 7: The method according to any preceding embodiment, wherein the at least one additional measurement comprises CBL, VDL, temperature, pulsed-echo, nuclear, or pulsed-neutron.

Embodiment 8: The method according to any preceding embodiment, further comprising performing a micro-annulus relative size determination by adding at least one additional measurement to the shear attenuation rate measurement and a flexural attenuation rate measurement.

Embodiment 9: The method according to any preceding embodiment, wherein the at least one additional measurement comprises ultra-sonic pulsed echo measurements.

Embodiment 10: The method according to any preceding embodiment, wherein the division boundary values comprise: (i) gas division, (ii) low density liquid division, (iii) high density liquid division, (iv, v) micro-annulus division, (vii) unconsolidated, contaminated and others lightweight materials with low acoustic impedance division, and barite division.

Embodiment 11: The method according to any preceding embodiment, wherein the division boundary values are defined below a fluid/solid interface.

Embodiment 12: The method according to any preceding embodiment, wherein the (iv, v) micro-annulus division is separated into (iv) a micro-annulus material with a relatively small annular gap and (v) a micro-annulus material with a relatively large annular gap.

Embodiment 13: The method according to any preceding embodiment, wherein, when the measured shear attenuation rate and the measured flexural attenuation rate indicates a solid above a fluid/solid interface, a division separates between (i) a solid state material with relatively high acoustic impedance and (ii) a solid state material with relatively low acoustic impedance.

Embodiment 14: The method according to any preceding embodiment, wherein the division separating the relatively high acoustic impedance material from the relatively low acoustic impedance material is defined as a shear threshold.

Embodiment 15: The method according to any preceding embodiment, wherein the determining one or more properties comprise determining that the media is a solid if the measured shear attenuation rate is greater than or equal to a shear attenuation interface.

Embodiment 16: The method according to any preceding embodiment, wherein the media has a relatively high acoustic impedance if the flexural attenuation rate measurement is greater than a shear threshold and the media has a relatively low acoustic impedance if the flexural attenuation rate measurement is less than the shear threshold.

Embodiment 17: The method according to any preceding embodiment, wherein the determining one or more properties comprise determining that the media is a fluid if the measured shear attenuation rate is less than a shear attenuation interface.

Embodiment 18: The method according to any preceding embodiment, wherein determining that the media is a gas if the measured flexural attenuation rate is below a low density liquid threshold.

Embodiment 19: The method according to any preceding embodiment, wherein determining that the media is a low density liquid if the measured flexural attenuation rate is above a low density liquid threshold and below a high density liquid threshold.

Embodiment 20: The method according to any preceding embodiment, wherein determining that the media is a micro-annulus material if the measured flexural attenuation rate is above a high density liquid threshold and below a micro-annulus-unconsolidated, contaminated and other lightweight materials with low acoustic impedance threshold.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively, or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second)" and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While embodiments described herein have been described with reference to various embodiments, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed as the best mode contemplated for carrying the described features, but that the present disclosure Will include all embodiments falling within the scope of the appended claims.

Accordingly, embodiments of the present disclosure are not to be seen as limited by the foregoing description, but are only limited by the scope of the appended claims.

What is claimed is:

1. A method for determining properties of a downhole media on an exterior of a casing, comprising:
   storing a set of division boundary values associated with downhole media located on an exterior of a casing in a computer readable medium, wherein the set of division boundary values consists of a divisional boundary for each of gas, low density liquid, high density liquid, micro-annulus materials, light-weight solids materials, and solids bonded to the casing;
   conveying a logging tool through the casing in a downhole formation;
   stimulating shear waves and flexural waves in the casing using the downhole logging tool;
   obtaining a shear attenuation rate measurement and a flexural attenuation rate measurement within the casing responsive to the downhole media on the exterior of the casing;
   comparing the measured shear attenuation rate and the measured flexural attenuation rate against the set of division boundary values;
   determining one or more properties of the downhole media on the exterior of the casing based on the comparison of the measured shear attenuation rate and the measured flexural attenuation rate against the set of division boundary values, wherein the one or more properties comprise at least one of the measured shear attenuation rate and the measured flexural attenuation rate; and
   determining the downhole media on the exterior of the casing based on the determined one or more properties.

2. The method of claim 1, further comprising determining if a solid in the annular space is bonded to the casing or to the downhole formation.

3. The method of claim 1, further comprising evaluating cement behind the casing in a liquid/slurry form and determining a distinction of such liquid/slurry from other liquids.

4. The method of claim 1, further comprising evaluating mechanical properties of a solid bonded to the casing.

5. The method of claim 1, wherein, when the measured shear attenuation rate and the measured flexural attenuation rate indicates a solid above a fluid/solid interface, a division separates between (i) a solid state material with relatively high acoustic impedance and (ii) a solid state material with relatively low acoustic impedance.

6. The method of claim 1, wherein the division separating the relatively high acoustic impedance material from the relatively low acoustic impedance material is defined as a shear threshold.

7. The method of claim 1, further comprising performing a micro-annulus relative size determination by adding at least one additional measurement to the shear attenuation rate measurement and a flexural attenuation rate measurement.

8. The method of claim 7, wherein the at least one additional measurement comprises ultra-sonic pulsed echo measurements.

9. The method of claim 1, wherein the determining one or more properties comprise determining that the downhole media is a solid if the measured shear attenuation rate is greater than or equal to a fluid/solid interface attenuation rate.

10. The method of claim 9, wherein the downhole media has a relatively high acoustic impedance if the flexural attenuation rate measurement is greater than a shear threshold and the downhole media has a relatively low acoustic impedance if the flexural attenuation rate measurement is less than the shear threshold.

11. The method of claim 1, further comprising integrating at least one additional measurement to the shear attenuation rate measurement and a flexural attenuation rate measurement to determine the one or more properties of the downhole media on the exterior of the casing.

12. The method of claim 11, wherein the at least one additional measurement comprises a CBL, VDL, temperature, nuclear, or pulsed-neutron measurement.

13. The method of claim 11, wherein the at least one additional measurement comprises a pulse-echo measurement.

14. The method of claim 1, wherein the division boundary values comprise: (i) gas division, (ii) low density liquid division, (iii) high density liquid division, (iv, v) micro-annulus division, (vii) unconsolidated, contaminated and other lightweight materials with low acoustic impedance division, and barite division.

15. The method of claim 14, wherein the division boundary values are defined below a fluid/solid interface.

16. The method of claim 15, wherein the (iv, v) micro-annulus division is separated into (iv) a micro-annulus material with a relatively small annular gap and (v) a micro-annulus material with a relatively large annular gap.

17. The method of claim 1, wherein the determining one or more properties comprise determining that the downhole media is a fluid if the measured shear attenuation rate is less than a fluid/solid interface attenuation rate.

18. The method of claim 17, wherein determining that the downhole media is a gas if the measured flexural attenuation rate is below a low density liquid threshold.

19. The method of claim 17, wherein determining that the downhole media is a low density liquid if the measured flexural attenuation rate is above a low density liquid threshold and below a high density liquid threshold.

20. The method of claim 17, wherein determining that the downhole media is a micro-annulus material if the measured flexural attenuation rate is above a high density liquid threshold and below a micro-annulus-unconsolidated, contaminated and other lightweight materials with low acoustic impedance threshold.

* * * * *